(12) United States Patent
Bashyam et al.

(10) Patent No.: US 11,769,885 B2
(45) Date of Patent: Sep. 26, 2023

(54) MEMBRANE ELECTRODE ASSEMBLY WITH IMPROVED PERFORMANCE USING TWO COMPONENT FLUORINATED BLENDED ELECTROLYTE ADDITIVES

(71) Applicant: HYZON MOTORS INC., Honeoye Falls, NY (US)

(72) Inventors: Rajesh Bashyam, Delta (CA); Zhai Jun, Shanghai (CN)

(73) Assignee: HYZON MOTORS INC., Honeoye Falls, NY (US)

( * ) Notice: Subject to any disclaimer, the term of this patent is extended or adjusted under 35 U.S.C. 154(b) by 9 days.

(21) Appl. No.: 17/487,003

(22) Filed: Sep. 28, 2021

(65) Prior Publication Data
US 2022/0102733 A1 Mar. 31, 2022

Related U.S. Application Data

(60) Provisional application No. 63/084,185, filed on Sep. 28, 2020.

(51) Int. Cl.
*H01M 4/86* (2006.01)
*H01M 4/88* (2006.01)
*H01M 4/92* (2006.01)

(52) U.S. Cl.
CPC ....... *H01M 4/8668* (2013.01); *H01M 4/8673* (2013.01); *H01M 4/8825* (2013.01); *H01M 4/926* (2013.01); *H01M 2004/8689* (2013.01)

(58) Field of Classification Search
CPC ............. H01M 4/8668; H01M 4/8673; H01M 4/8825; H01M 4/926; H01M 2004/8689
See application file for complete search history.

(56) References Cited

U.S. PATENT DOCUMENTS

| | | | |
|---|---|---|---|
| 6,074,773 A | 6/2000 | Wilkinson et al. | |
| 6,306,536 B1* | 10/2001 | Wilkinson | H01M 8/04253 429/492 |
| 8,507,151 B2 | 8/2013 | Budinski | |
| 8,828,613 B2 | 9/2014 | Zhang et al. | |
| 2005/0037265 A1 | 2/2005 | Watakabe | |
| 2006/0099486 A1* | 5/2006 | Sompalli | H01M 4/8605 429/496 |
| 2007/0281198 A1 | 12/2007 | Lousenberg | |
| 2008/0248362 A1* | 10/2008 | Sayre | H01M 4/8652 252/500 |

OTHER PUBLICATIONS

Written Opinion of the International Searching Authority dated Dec. 27, 2021.

* cited by examiner

*Primary Examiner* — Brittany L Raymond
(74) *Attorney, Agent, or Firm* — Jacob M. Ward; Ward Law Office LLC (57) ABSTRACT

An electrode layer can have an electrically conductive material, a catalyst, an ionomer binder, and a perfluorocarbon compound. The ionomer binder forms hydrophilic regions on the electrically conductive material to support proton and water transport. The perfluorocarbon compound forms hydrophobic regions on the electrically conductive material to support oxygen solubility and transport. The electrode can be used in making a membrane electrode assembly and can be configured as a cathode thereof. Fuel cells and fuel stacks can include such membrane electrode assemblies.

20 Claims, 4 Drawing Sheets

MEMBRANE ELECTRODE ASSEMBLY WITH IMPROVED PERFORMANCE USING TWO COMPONENT FLUORINATED BLENDED ELECTROLYTE ADDITIVES

CROSS-REFERENCE TO RELATED APPLICATIONS

This application claims the benefit of U.S. Provisional Application Ser. No. 63/084,185 filed on Sep. 28, 2020. The entire disclosure of the above application is hereby incorporated herein by reference.

FIELD

The present disclosure relates to fuel cells, and more particularly, to electrodes for membrane electrode assemblies of fuel cells.

INTRODUCTION

This section provides background information related to the present disclosure which is not necessarily prior art.

Fuel cell systems can be used as power supplies in numerous applications, such as vehicles and stationary power plants. Such systems offer promise of delivering power economically and with environmental and other benefits. To be commercially viable, however, fuel cell systems should exhibit adequate reliability in operation, even when the fuel cells are subjected to conditions outside their preferred operating ranges.

Fuel cells convert reactants, namely, fuel and oxidant, to generate electric power and reaction products. Polymer electrolyte membrane fuel cells (PEM fuel cell) employ a membrane electrode assembly (MEA), which includes a polymer electrolyte or ion-exchange membrane disposed between two electrodes, namely a cathode and an anode. A catalyst typically induces the desired electrochemical reactions at the electrodes. Separator plates or bipolar plates, including plates providing a flow field for directing the reactants across a surface of each electrode substrate, are disposed on each side of the MEA.

In operation, the output voltage of an individual fuel cell under load can be below one volt. Therefore, in order to provide greater output voltage, multiple cells can be stacked together and can be connected in series to create a higher voltage fuel cell stack. End plate assemblies can be placed at each end of the stack to hold the stack together and to compress the stack components together. Compressive force can provide sealing and adequate electrical contact between various stack components. Fuel cell stacks can then be further connected in series and/or parallel combinations to form larger arrays for delivering higher voltages and/or currents.

Although fuel cells offer a promising alternative to fossil fuel-based power generation, the application of fuel cell technology to create an optimized fuel cell has proven to be difficult. For example, optimizing the power density of a fuel cell is an ongoing process and increasing power density is highly desirable. Fuel cells with enhanced power density can provide many advantages, including cost and weight optimizations. However, improving high current density performance is a challenge, as considerable polarization loss can occur at high current density. In particular, oxygen transport resistance can increase with reduced catalyst loading and can also result in degradation of the catalyst layer.

Currently, low equivalent weight short side chain ionomer and specific functionalized ionomer can be used to improve performance of the catalyst, but trade-offs exist with these approaches. For example, short side chain low equivalent weight ionomer can swell and cause flooding which can inhibit oxygen transport. In addition, certain functionalized ionomers can be expensive and are not commercially available.

There is a continuing need for an electrode for a membrane electrode assembly that can has an optimized power density. Desirably, the electrode should improve power density and decrease oxygen transport resistance.

SUMMARY

In concordance with the instant disclosure, an electrode with optimized power density and improved oxygen transport, and which can militate against ionomer swelling, has been surprisingly discovered.

In certain embodiments, an electrode is provided that includes an electrically conductive material, a catalyst, an ionomer binder, and a perfluorocarbon compound. The electrically conductive material can include carbon particles, including various types of carbon-based supports. The catalyst can include one or more noble metals, such as platinum, and can be disposed on the electrically conductive material. The ionomer binder and the perfluorocarbon compound can be disposed on the electrically conductive material. The perfluorocarbon compound can include various perfluorocarbon compounds, including one or more perfluorocarbons having six to nine carbon atoms, perfluorotributylamine, nonafluoro-propoxyhexane, and tridecafluoro-propoxyoctane. In this way, the ionomer binder can form hydrophilic regions on the electrically conductive material to support proton and water transport and the perfluorocarbon compound can form hydrophobic regions on the electrically conductive material to support oxygen solubility and transport. Oxygen transport to the catalyst in the electrode is thereby improved, which can increase power density of a fuel cell incorporating the electrode, as well as minimize flooding and increase durability.

Ways of making and using the electrode are provided. These include making an electrode by disposing a catalyst on an electrically conductive material to form a catalyst loaded material, followed by disposing an ionomer binder and a perfluorocarbon compound on the catalyst loaded material to form the electrode. The electrode can be used in making a membrane electrode assembly by depositing the electrode on a proton exchange membrane. Likewise, a fuel cell can be made where the electrode deposited on the proton exchange membrane is positioned as a cathode of the fuel cell.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology relates to electrodes and ways of making and using such electrodes for improved oxygen utilization and resultant power density in a fuel cell, where such electrodes are particularly adapted for use as cathodes in membrane electrode assemblies of fuel cells. An electrode for a membrane electrode assembly of a fuel cell, as provided herein, can include an electrically conductive material, a catalyst, an ionomer binder, and a perfluorocarbon compound. The ionomer binder can facilitate access of protons to the catalyst and the perfluorocarbon compound can facilitate access of oxygen to the catalyst to form water as a reaction product, thereby optimizing the electrochemical reaction of hydrogen and oxygen to electrical energy in the fuel cell. It should be appreciated that the electrode can also be used as an anode, or both an anode and a cathode, in a membrane electrode assembly for a fuel cell.

The electrically conductive material can include various aspects. The electrically conductive material can include various inert conductive materials, including various porous materials, as well as various materials that provide a high surface area. Additional examples including various particulate materials and fibrous materials, including carbon particles and carbon fibers. A particular non-limiting example of the electrically conductive material includes carbon particles. Other examples include various forms of carbon black, activated carbon, mesophase carbon, etc. However, it should be appreciated that a skilled artisan can employ different materials for the electrically conductive material, as desired. The electrically conductive material can be used to support the catalyst. For example, particles of catalyst (e.g., platinum (Pt)) can be disposed on the electrically conductive material, where the electrically conductive material includes a high-surface-area carbon support to form catalyst-loaded particles (e.g., Pt/C). Various other types of electrically conductive materials can be loaded with catalyst, as well.

The catalyst can include various aspects. The catalyst can be configured to facilitate the reaction of protons and oxygen. For example, the catalyst can allow protons and oxygen to react, which can form water and/or other byproducts. In certain examples, the catalyst can be configured to catalyze the electrochemical reduction of oxidant gases, including oxygen. The catalyst can be disposed on the electrically conductive material. Nonlimiting examples of the catalyst can include various noble metal catalysts, including platinum based catalysts, platinum ruthenium based catalysts, palladium based catalysts, iridium based catalysts and other catalysts (e.g., Ag, Au, Co, Cu, Fe, Ni, Rh, Ru, Sn, etc.). Other materials and combinations of materials for the catalyst are also contemplated, within the scope of this disclosure. In certain embodiments, the catalyst is provided as particles of platinum (Pt) disposed or deposited on a high-surface-area carbon support serving as the electrically conductive material. However, other catalysts, including one or more noble metals, can also be used. The catalyst can also be tailored for particular use in an anode or for particular use in a cathode. The supported platinum catalyst can be mixed sequentially or in combination with the ionomer binder and/or the perfluorocarbon compound.

The ionomer binder can include various aspects. The ionomer binder can include an ion-conducting polymer, including a mixture of polymers including an ion-conducting polymer, as well as co-polymers capable of conducting ions. The ionomer binder can include various anionic pendant groups (e.g., sulfonate groups) that can serve to conduct protons. Examples include sulfonated tetrafluoroethylene-based fluoropolymer-copolymers, such as those available from E.I. Dupont de Nemours & Co. under the trade designation NAFION. Another such sulfonated fluorinated ion exchange resin is sold by Dow Chemical. In certain embodiments, the ionomer binder can be configured to bind other components of the electrode together. The ionomer binder, for example, can bind instances of the electrically conductive material together, where the electrically conductive material can be in the form of discrete particles or fibers, e.g., carbon particles. The ionomer binder can be disposed on the electrically conductive material. In this way, the ionomer binder can form hydrophilic regions on the electrically conductive material. Desirably, the hydrophilic regions can facilitate proton and water transport and access thereof to the catalyst disposed on the electrically conductive material. Other examples of the ionomer binder include ion exchange materials capable of binding the electrically conductive material, the catalyst, and the perfluorocarbon compound, as well as bind to a proton exchange membrane, and provide sufficient ion exchange capacity to sustain electrochemical reactions on and within a cathode layer of an MEA of a fuel cell. Certain embodiments include where the ionomer binder is disposed on the electrically conductive material and forms hydrophilic regions on the electrically conductive material to support proton and water transport.

The perfluorocarbon compound can include various aspects. The perfluorocarbon compound can be disposed on the electrically conductive material. In this way, the perfluorocarbon compound can form hydrophobic regions on the electrically conductive material to support oxygen solubility and transport. Oxygen access to the catalyst can therefore be improved. Certain embodiments include where the perfluorocarbon compound includes six to nine carbon atoms. The perfluorocarbon compound can also include one or more of perfluorotributylamine, nonafluoro-propoxyhexane, and tridecafluoro-propoxyoctane. Various combinations and/or amounts of perfluorocarbon compounds including six to nine carbon atoms, perfluorotributylamine, nonafluoro-propoxyhexane, and tridecafluoro-propoxyoctane can be used to tailor a hydrophobic character of the electrode. In particular, perfluorocarbon compounds including six to nine carbon atoms can increase hydrophobicity, whereas perfluorotributylamine, nonafluoro-propoxyhexane, and/or tridecafluoro-propoxyoctane can moderate hydrophobicity. Accordingly, an optimized balance can be struck by providing hydrophobic portions of the electrode (using the perfluorocarbon compound) allowing access of oxygen to the catalyst while also providing hydrophilic portions of the electrode (using the ionomer binder) allowing access of protons to the catalyst, thereby facilitating the electrochemical reactions of the fuel cell.

Certain embodiments of the electrode can include the following aspects. The electrically conductive material can include carbon particles. The catalyst can include platinum and can be disposed on the electrically conductive material. The ionomer binder and the perfluorocarbon compound can both be disposed on the electrically conductive material. The perfluorocarbon compound can include one or more perfluorocarbon compounds having six to nine carbon atoms, perfluorotributylamine, nonafluoro-propoxyhexane, and tridecafluoro-propoxyoctane. Electrodes configured in this manner can be particularly adapted for use as cathodes in membrane electrode assemblies of fuel cells, fuel cell stacks, and electric vehicles.

Electrodes contemplated by the present technology can be made in various ways. One method of making the electrode includes disposing the catalyst on the electrically conductive material to form a catalyst loaded material, followed by disposing the ionomer binder and the perfluorocarbon compound on the catalyst loaded material to form the electrode. Various ways of disposing catalysts on electrically conductive materials can be used, including mixing a noble metal (e.g., Pt) precursor and the electrically conductive material (e.g., carbon particles), where the noble metal precursor is subsequently reduced to metallic particles that are deposited on the electrically conductive material. Likewise, various ways of disposing the ionomer binder and the perfluorocarbon compound on the catalyst loaded material can be used, including where a slurry or ink including the catalyst loaded material, the ionomer binder, and the perfluorocarbon compound is applied or cast onto a substrate to form an electrode layer. The applied or cast electrode layer can be heated, allowing the ionomer binder to partially melt and bind the electrode components together. The substrate can be a proton exchange membrane or the electrode can be transferred from the substrate to a proton exchange membrane.

Other methods include making a membrane electrode assembly, where an electrode made according to the present technology is disposed or deposited on a proton exchange membrane to form the MEA. Such MEAs can be used in making a fuel cell or a fuel cell stack, including where the electrode deposited on the proton exchange membrane is positioned and used as a cathode in the fuel cell or fuel cell stack. Such fuel cells and stacks thereof can be used to supply electrical power in various contexts, including electric vehicles. Advantageously, electrodes prepared according to the present technology serve to optimize the power density of the fuel cell and decrease oxygen transport resistance.

Examples

Example embodiments of the present technology are provided with reference to the several figures enclosed herewith.

Figure 1:
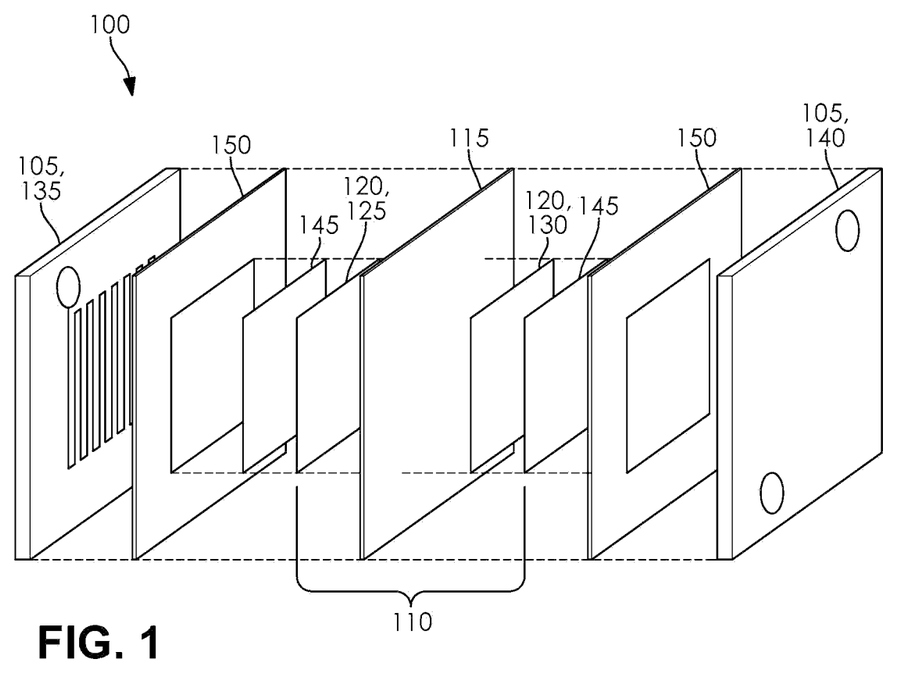
FIG. 1 is an exploded schematic perspective view of an embodiment of a fuel cell having an electrode according to the present technology.

With reference to FIG. 1, an embodiment of a fuel cell 100 constructed in accordance with the present technology is shown in an exploded schematic perspective view. The fuel cell 100 can include a pair of plates 105, which can be separator plates of bipolar plates in a fuel cell stack or end plates at the end of a fuel stack or a single fuel cell. The plates 105 can operate to distribute reactant fluids and collect electrical current generated in operation of the fuel cell 100. The plates can 105 sandwich a membrane electrode assembly (MEA) 110, where the MEA 110 incudes a proton exchange membrane 115 flanked by electrodes 120. The proton exchange membrane 115 can be configured to be permeable to protons while acting as an electric insulator and reactant fluid barrier, e.g., preventing passage of oxygen and hydrogen. The electrodes 120 can include an anode 125 and a cathode 130, where hydrogen can be supplied to the anode 125 and oxygen or air can be supplied to the cathode 130, each of the electrodes 120 including a catalyst to facilitate the electrochemical conversion of hydrogen to protons at the anode 125 and the oxygen reduction reaction of the protons at the cathode 130. The plates 105 can be used to distribute the reactant fluids for the fuel cell 100 using reactant fluid channels and flow fields formed therein, where one of the plates 105, 135 can distribute the hydrogen to the anode 125 and the other of the plates 105, 140 can distribute the oxygen or air to the cathode 130. Gas diffusion layers 145 can be positioned between the electrodes 120 and the plates 105 in order to facilitate distribution of the reactant fluids. As shown, the gas diffusion layers 145 can be separate components. However, certain embodiments can include where the gas diffusion layers 145 and the electrodes 120 can be integrated. Gaskets 150 can be used to provide a fluid-tight seal between the plates 105 and the MEA 110, effectively sealing the distribution of reactant fluids from the plates 105, through the gas diffusion layers 145, to the respective electrodes 120 flanking the proton exchange membrane 115. It should be appreciated that other types of sealing mechanisms can be used in place of the gaskets 150.

Figure 2:
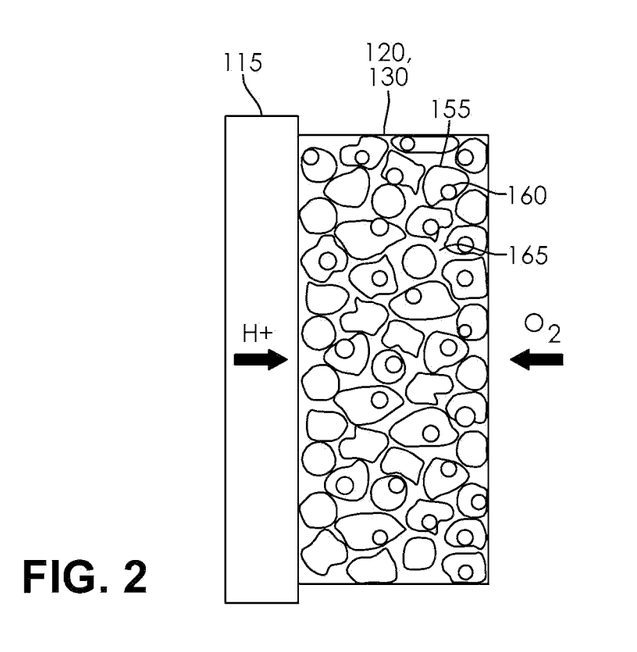
FIG. 2 is a schematic view of an embodiment of a proton exchange membrane having disposed thereon an electrode layer according to the present technology.

With reference to FIG. 2, a close-up schematic view is shown of an embodiment of a proton exchange membrane 115 having disposed thereon a layer of an electrode 120 constructed in accordance with the present technology. The electrode 120 includes an electrically conductive material, a catalyst, an ionomer binder, and a perfluorocarbon compound. As depicted in the embodiment shown, the electrically conductive material is in the form of a multitude of carbon particles 155 having the catalyst 160 deposited thereon. It should be recognized that the electrically conductive material can be provided in other forms in place of or in addition to the carbon particles 155, including various forms of carbon black, activated carbon, mesophase carbon, etc. A portion of the interstitial spaces 165 between the carbon particles 155 can include various amounts of the ionomer binder and the perfluorocarbon compound. For example, the ionomer binder can be provided and treated (e.g., using heat) to bind the carbon particles 155 to form a generally solid electrode 120, as well as to bind the electrode 120 to the proton exchange membrane 115. In the embodiment depicted, the electrode 120 is a cathode 130, where protons (W) permeate through the proton exchange 115 to the cathode 130 and oxygen ($O_2$) is provided to the cathode 130.

Figure 3:
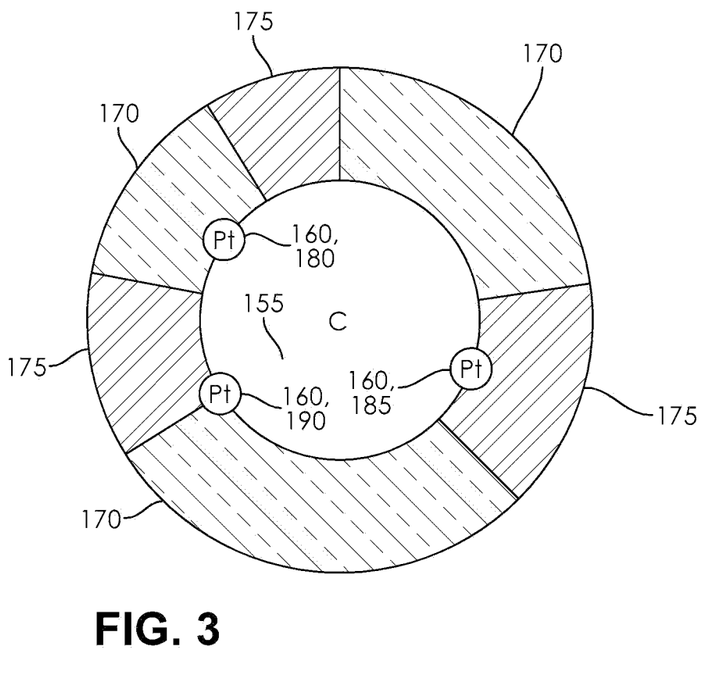
FIG. 3 is an enlarged view of an electrically conductive material having disposed thereon a catalyst, an ionomer binder, and a perfluorocarbon compound according to the present technology.

With reference to FIG. 3, an enlarged schematic view of an electrically conductive material having disposed thereon a catalyst, an ionomer binder, and a perfluorocarbon compound in accordance with the present technology. Here, as in FIG. 2, the electrically conductive material is in the form of a carbon particle 155 having the catalyst 160 (e.g., Pt) deposited thereon. It should be noted that the carbon particle 155 can be porous and have an irregular shape, as opposed to the simple schematic depiction of a circular cross-section, as shown. Various portions and amounts of the ionomer binder are shown at 170 and various portions and amounts of the perfluorocarbon compound are shown at 175. It should be appreciated that the ionomer binder 170 and perfluorocarbon compound 175 can be deposited to various extents on the carbon particle 155 and may not completely cover the carbon particle 155. Likewise, the ionomer binder 170 and/or perfluorocarbon compound 175 can extend into the interstitial space 165 between multiple carbon particles 155, serving to bind and bridge the carbon particles 155.

Without being bound by theory, it is believed that the various amounts of the ionomer binder 170 and perfluorocarbon compound 175 can provide hydrophilic regions and hydrophobic regions relative the catalyst 160 deposited on the carbon particle 155. In particular, the ionomer binder 170 can provide hydrophilic regions on the carbon particle 155 to support proton and water transport to the catalyst 160, whereas the perfluorocarbon compound 175 can provide hydrophobic regions on the carbon particle 155 to support oxygen solubility and transport to the catalyst 160. Certain instances of catalyst 160 can include where the ionomer binder 170 facilitates access to the catalyst 160, as shown at 180. Certain instances of catalyst 160 can include where the perfluorocarbon compound 175 facilitates access to the catalyst 160, as shown at 185. Certain instances of catalyst 160 can include where the ionomer binder 170 and the perfluorocarbon compound 175 facilitate access to the same catalyst 160, as shown at 190. In this way, oxygen access to the catalyst 160 is improved, where the electrode 120, 130 constructed in accordance with the present technology can improve power density of the fuel cell 100.

Figure 4:
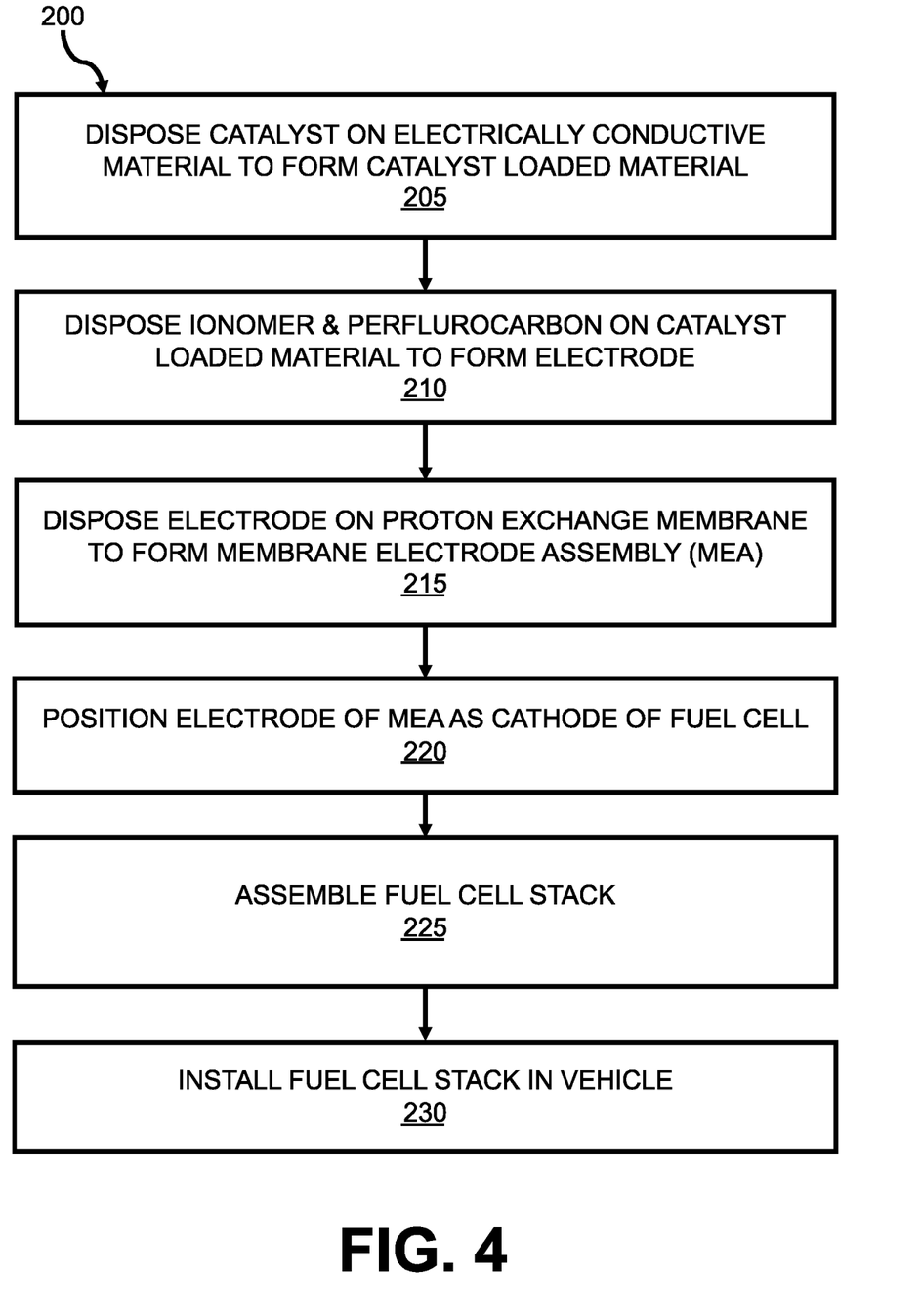
FIG. 4 is a flowchart of a method of making an electrode for use in a membrane electrode assembly, which in turn can be used in making a fuel cell, in accordance with the present technology.

With reference to FIG. 4, shown at 200 is flowchart of an embodiment of a method of making an electrode for use in a membrane electrode assembly, which in turn can be used in making a fuel cell for powering a vehicle, in accordance with the present technology. At step 205, a catalyst can be disposed on an electrically conductive material to form a catalyst loaded material. At step 210, an ionomer binder and a perfluorocarbon compound can be disposed on the catalyst loaded material to form the electrode. At step 215, the electrode can be disposed on a proton exchange membrane to form a membrane electrode assembly (MEA). At step 220, the electrode disposed on the proton exchange membrane of the MEA can be positioned as a cathode of a fuel cell. At step 225, multiple fuel cells can be combined to form a fuel stack, where at step 230, the fuel cell stack can be installed as an electrical power plant in a vehicle.

Figure 5:
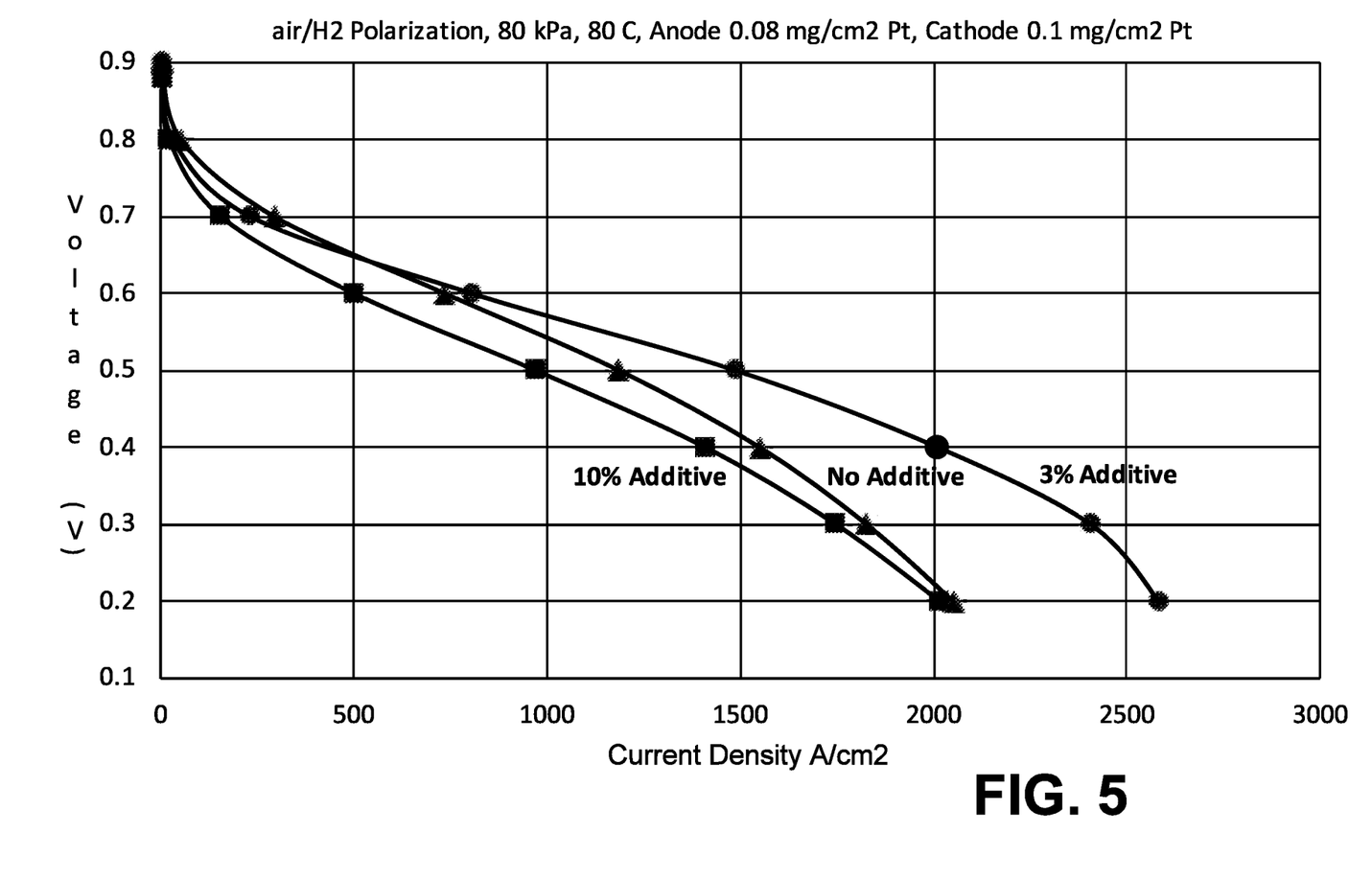
FIG. 5 is a graph depicting changes in current density versus voltage for embodiments of fuel cells including electrodes having different amounts of perfluorocarbon compound, where the absence of perfluorocarbon compound ("no additive") is denoted by triangular markers, 3% perflurocarbon compound ("3% additive") is denoted by circular markers, and 10% perfluorocarbon compound ("10% additive") is denoted by square markers.

With reference to FIG. 5, plots of current density versus voltage are shown in a graph for three embodiments of fuel cells including electrodes having different amounts of perfluorocarbon compound. Three cathodes were constructed having an electrically conductive material, a catalyst, and an ionomer binder, where different amounts of perfluorocarbon compound were employed. The first cathode included no perfluorocarbon compound, the second cathode included 3% perfluorocarbon compound, and the third cathode included 10% perfluorocarbon compound. These cathodes were used in construction of membrane electrode assemblies for use in fuel cells. Each of resulting fuel cells included the following specifications and operating parameters: air/$H_2$ polarization, 80 kPa, 80° C., anode 0.08 mg/cm$^2$ Pt, cathode 0.1 mg/cm$^2$ Pt.

With respect to the plots shown in FIG. 5, current density versus voltage for the fuel cell having the first cathode (no perfluorocarbon compound/"no additive") is denoted by triangular markers, for the second cathode (3% perfluorocarbon compound/"3% additive") is denoted by circular markers, and the third cathode (10% perfluorocarbon compound/"10% additive") is denoted by square markers. As can be seen, the amount of perfluorocarbon compound can be tailored to decrease oxygen transport resistance and improve power density. There is a substantial improvement in current density (A/cm$^2$) of the cathode having 3% perfluorocarbon compound versus the cathode having no perfluorocarbon compound. However, it can also be seen that continuing to increase the amount perfluorocarbon compound has a trade off in performance, where the 10% perfluorocarbon compound does not perform as well as the 3% perfluorocarbon compound under the particular fuel cell specifications and operating conditions employed in these experiments. It is therefore demonstrated that certain amounts of perfluorocarbon compounds can be used to tailor a hydrophobic character of the electrode, optimizing operation of a fuel cell including such, where an optimal range or amount of perfluorocarbon compound can be determined before performance is affected by providing too much perfluorocarbon compound in the electrode.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. An electrode for a membrane electrode assembly of a fuel cell, comprising:
   a catalyst loaded material including an electrically conductive material and a catalyst disposed on the electrically conductive material;
   an ionomer binder; and
   a perfluorocarbon compound;
   wherein the ionomer binder and the perfluorocarbon compound are disposed on the catalyst loaded material by simultaneously mixing a composition including the catalyst loaded material, the ionomer binder, and the perfluorocarbon compound, the composition formed by independently combining the catalyst loaded material, the ionomer binder, and the perfluorocarbon compound.

2. The electrode of claim 1, wherein the electrically conductive material includes carbon particles.

3. The electrode of claim 1, wherein the catalyst includes platinum.

4. The electrode of claim 1, wherein the ionomer binder forms hydrophilic regions on the electrically conductive material to support proton and water transport.

5. The electrode of claim 1, wherein the perfluorocarbon compound forms hydrophobic regions on the electrically conductive material to support oxygen solubility and transport.

6. The electrode of claim 1, wherein the perfluorocarbon compound includes a member selected from a group consisting of a perfluorocarbon compound including six to nine carbon atoms, perfluorotributylamine, nonafluoro-propoxyhexane, tridecafluoro-propoxyoctane, and combinations thereof.

7. The electrode of claim 1, wherein:
   the electrically conductive material includes carbon particles;
   the catalyst includes platinum; and
   the perfluorocarbon compound includes a member selected from a group consisting of a perfluorocarbon having six to nine carbon atoms, perfluorotributylamine, nonafluoro-propoxyhexane, tridecafluoro-propoxyoctane, and combinations thereof.

8. The electrode of claim 1, wherein the electrode includes 3% perfluorocarbon compound.

9. The electrode of claim 1, wherein the electrode provides an increase in current density in operation compared to an identically constructed electrode without the perfluorocarbon compound.

10. The electrode of claim 1, wherein the perfluorocarbon compound includes:
    a perfluorocarbon compound including six to nine carbon atoms; and a member selected from a group consisting of perfluorotributylamine, nonafluoro-propoxyhexane, tridecafluoro-propoxyoctane, and combinations thereof.

11. The electrode of claim 1, wherein the electrode is not integrated with a gas diffusion medium.

12. The electrode of claim 1, wherein the ionomer binder and the perfluorocarbon compound are disposed on the catalyst loaded material by mixing the composition including the catalyst loaded material, the ionomer binder, and the perfluorocarbon compound in combination.

13. A membrane electrode assembly including an electrode according to claim 1.

14. A fuel cell including a membrane electrode assembly according to claim 13, wherein the electrode operates as a cathode of the fuel cell.

15. A vehicle including a fuel cell according to claim 14.

16. A method for manufacturing an electrode for a membrane electrode assembly of a fuel cell, the method comprising:
    disposing a catalyst on an electrically conductive material to form a catalyst loaded material; and
    disposing an ionomer binder and a perfluorocarbon compound on the catalyst loaded material by simultaneously mixing a composition including the catalyst loaded material, the ionomer binder, and the perfluorocarbon compound, the composition formed by independently combining the catalyst loaded material, the ionomer binder, and the perfluorocarbon compound.

17. The method of claim 16, wherein the perfluorocarbon compound includes a member selected from a group consisting of a perfluorocarbon compound including six to nine carbon atoms, perfluorotributylamine, nonafluoro-propoxyhexane, tridecafluoro-propoxyoctane, and combinations thereof.

18. The method of claim 16, wherein:
    the electrically conductive material includes carbon particles;
    the catalyst includes platinum;
    and
    the perfluorocarbon compound includes a member selected from a group consisting of a perfluorocarbon having six to nine carbon atoms, perfluorotributylamine, nonafluoro-propoxyhexane, tridecafluoro-propoxyoctane, and combinations thereof.

19. A method for manufacturing a membrane electrode assembly, the method comprising:
    providing an electrode made according to the method of claim 16; and
    disposing the electrode on a proton exchange membrane.

20. A method for manufacturing a fuel cell, the method comprising:
    providing a proton exchange membrane having an electrode deposited thereon according to the method of claim 19; and
    positioning the electrode disposed on the proton exchange membrane as a cathode of the fuel cell.

\* \* \* \* \*

UNITED STATES PATENT AND TRADEMARK OFFICE
CERTIFICATE OF CORRECTION

PATENT NO. : 11,769,885 B2
APPLICATION NO. : 17/487003
DATED : September 26, 2023
INVENTOR(S) : Rajesh Bashyam et al.

Page 1 of 1

It is certified that error appears in the above-identified patent and that said Letters Patent is hereby corrected as shown below:

On the Title Page

Item (72) Inventors, Should read as follows:
Rajesh Bashyam Delta (CA)
Jun Zhai Shanghai (CN)

Signed and Sealed this
Sixth Day of May, 2025

Coke Morgan Stewart
*Acting Director of the United States Patent and Trademark Office*